United States Patent
Modarres et al.

(10) Patent No.: US 10,078,368 B2
(45) Date of Patent: *Sep. 18, 2018

(54) METHOD AND APPARATUS TO PROVIDE HAPTIC FEEDBACK BASED ON MEDIA CONTENT AND ONE OR MORE EXTERNAL PARAMETERS

(71) Applicant: IMMERSION CORPORATION, San Jose, CA (US)

(72) Inventors: Ali Modarres, San Jose, CA (US); Christopher J. Ullrich, Ventura, CA (US); Jean Francois Dionne, Montreal (CA); Loc Phan, San Jose, CA (US); Satvir Singh Bhatia, San Jose, CA (US); Stephen D. Rank, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,330

(22) Filed: Feb. 26, 2016

(65) Prior Publication Data

US 2016/0179203 A1 Jun. 23, 2016

Related U.S. Application Data

(63) Continuation of application No. 14/181,144, filed on Feb. 14, 2014, now Pat. No. 9,274,603.
(Continued)

(51) Int. Cl.
*H04B 3/36* (2006.01)
*G06F 3/01* (2006.01)
(Continued)

(52) U.S. Cl.
CPC .............. *G06F 3/016* (2013.01); *G06F 3/165* (2013.01); *G08B 6/00* (2013.01)

(58) Field of Classification Search
CPC ............ G06F 3/016; G06F 3/165; G08B 6/00
(Continued)

(56) References Cited

U.S. PATENT DOCUMENTS 8,378,794 B2 2/2013 Alarcon
8,621,348 B2 12/2013 Ramsay et al.
(Continued)

FOREIGN PATENT DOCUMENTS

CN 102227694 A 10/2011
JP 2002135366 A 5/2002
(Continued)

OTHER PUBLICATIONS

Immersion Corporation; "Integrator Application"; published on or before Mar. 17, 2013; accessed Apr. 18, 2015; https://web.archive.org/web/20130317061654/http://www.immersion.com/products/integrator/>, all pages pertinent.
(Continued)

*Primary Examiner* — John A Tweel, Jr.
(74) *Attorney, Agent, or Firm* — Miles & Stockbridge P.C.

(57) ABSTRACT

The disclosure relates to systems and methods of providing haptic feedback based on media content and one or more external parameters used to customize the haptic feedback. The system may modify or otherwise alter haptic feedback that is determined using the media content alone. In other words, the system may use both the media content and the external parameters to determine haptic feedback that should be output to the user or others. The external parameters may include, for example, sensor information, customization
(Continued)

information, and/or other external parameters that may be used to customize the haptic feedback.

20 Claims, 6 Drawing Sheets

Related U.S. Application Data

(60) Provisional application No. 61/874,920, filed on Sep. 6, 2013, provisional application No. 61/827,341, filed on May 24, 2013.

(51) Int. Cl.
*G06F 3/16* (2006.01)
*G08B 6/00* (2006.01)

(58) Field of Classification Search
USPC .................................. 340/407.1; 715/702
See application file for complete search history.

(56) References Cited

U.S. PATENT DOCUMENTS

| 8,798,534 | B2* | 8/2014 | Rodriguez | G06F 3/016 |
| | | | | 340/407.2 |
| 9,092,954 | B2* | 7/2015 | Visitacion | G06F 3/016 |
| 9,274,603 | B2* | 3/2016 | Modarres | G06F 3/016 |

| 2006/0007182 | A1 | 1/2006 | Sato et al. |
| 2009/0096632 | A1 | 4/2009 | Ullrich et al. |
| 2010/0302015 | A1 | 12/2010 | Kipman et al. |
| 2012/0206246 | A1 | 8/2012 | Cruz-Hernandez et al. |
| 2012/0206247 | A1 | 8/2012 | Bhatia et al. |
| 2012/0229400 | A1 | 9/2012 | Birnbaum et al. |
| 2012/0306631 | A1 | 12/2012 | Hughes |
| 2013/0038792 | A1 | 2/2013 | Quigley et al. |
| 2014/0232534 | A1 | 8/2014 | Birnbaum |
| 2014/0253303 | A1 | 9/2014 | Levesque |
| 2014/0267911 | A1 | 9/2014 | Grant et al. |

FOREIGN PATENT DOCUMENTS

| JP | 2003324402 A | 11/2003 |
| JP | 2006024039 A | 1/2006 |
| JP | 2006270711 A | 10/2006 |
| JP | 2010278997 A | 12/2010 |
| WO | 2006019389 A2 | 2/2006 |
| WO | 2010007987 A1 | 1/2012 |

OTHER PUBLICATIONS

Immersion Corporation; "Integrator Application"; published on or before Apr. 15, 2012; accessed May 9, 2015; https://web.archive.org/web/20120415092914/http://www.immersion.com/products/integrator/>, all pages pertinent.

* cited by examiner

METHOD AND APPARATUS TO PROVIDE HAPTIC FEEDBACK BASED ON MEDIA CONTENT AND ONE OR MORE EXTERNAL PARAMETERS

RELATED APPLICATIONS

This application is a continuation of U.S. application Ser. No. 14/181,144, filed on Feb. 14, 2014, which claims priority to U.S. Provisional Patent Application Ser. No. 61/827,341, filed May 24, 2013, and U.S. Provisional Patent Application Ser. No. 61/874,920, filed Sep. 6, 2013, the specifications of which are herein incorporated by reference.

FIELD OF THE INVENTION

The disclosure relates to systems and methods of providing haptic feedback based on media content and external parameters used to customize the haptic feedback.

BACKGROUND OF THE INVENTION

Automatically determining haptic feedback based on media content can provide a powerful and immersive experience for the user. However, automatically determining such haptic feedback has conventionally taken into account only characteristics (e.g., tempo, frequency, amplitude, etc.) of the media content itself. External parameters, or information other than the characteristics of the media content, are typically ignored. As such, conventional systems that automatically determine haptic feedback based on characteristics of media content alone may not provide a flexible, configurable, and/or scalable solution that provides rich haptic feedback.

SUMMARY OF THE INVENTION

The disclosure relates to systems and methods of providing haptic feedback based on media content and one or more external parameters used to customize the haptic feedback. For example, a computing device may be programmed to modify or otherwise alter haptic feedback that is determined using the media content alone. In other words, the computing device may use both the media content and the external parameter(s) to determine haptic feedback that should be output to the user (or others). Such external parameters may include, for example, sensor information, customization information, and/or other external parameters that may be used to customize the haptic feedback.

The sensor information may include sensed conditions related to: an environment (e.g., ambient air temperature), spatial information (e.g., motion, location, orientation, etc.), biometrics information of a user that is being sensed (and who may receive the haptic feedback), and/or other information that can be sensed or otherwise determined about a user, object, and/or environment. In this manner, the computing device may take into account the environmental condition, the spatial information, the user's condition, and/or other sensed condition when automatically determining haptic feedback based on the media content.

For example, the computing device may compensate for ambient vibrations (e.g., when the user is riding on a train while listening to music) detected using the sensor information, determine different haptic feedback based on the user's location, motion, or biometrics information, and/or otherwise alter haptic feedback even though the same media content is used as the basis for automatically determining the haptic feedback. In a further example, a user playing a video game on a train ride during which ambient vibrations are present may be provided with a first haptic feedback based on gameplay and be provided with a second, less strong, haptic feedback based on gameplay while playing the same video game where the ambient vibrations are less pronounced, non-existent, or otherwise below a threshold level of vibration. This is because while riding on the train, the computing device may compensate for the ambient vibrations that are present while riding on the train.

The customization information may include user profile information, computing device state information, haptic output device type information, and/or other information that may be used to customize the haptic feedback. User profile information may indicate one or more user preferences that are used to determine haptic feedback based on the media content. For example, the user who is to receive the haptic feedback may provide one or more preferences or settings that the computing device uses to determine haptic feedback. Such settings may specify different contexts (e.g., use cases) in which the user can specify user preferences that cause different haptic feedback to be determined based on the media content.

In this manner, contexts such as the user watching a movie, listening to music, exercising, and/or other contexts may be used to automatically determine haptic feedback based on media content. Such contexts may be determined based on the sensor information, input by the user, based on computing device state information (e.g., an application running in the foreground), and/or other information. In some implementations, the customization information may indicate a type and/or number of haptic output devices that are used to output the haptic feedback. In this manner, the computing device may take into account the type and/or number of haptic output devices when determining the haptic feedback.

In some implementations, the context may include any number of the external parameters described herein. For example, the type and/or number of haptic output devices, the type of media content being played back, the sensor information, and/or other information may be used to automatically determine haptic feedback. In some of these implementations, a given external parameter may be weighted to indicate a corresponding level of importance by which the given external parameter is to be accorded to alter the haptic feedback.

Any one of the external parameters may be combined with one or more other external parameters to alter haptic feedback that would have been determined had the external parameters not been used to automatically determine the haptic feedback. As such, the system may facilitate richer, fuller, and customizable haptic feedback that is automatically determined based on the media content and one or more external parameters.

In operation, the computing device may take into account one or more of the external parameters when automatically determining haptic feedback based on the media content. For example, a user may be wearing wearable devices that sense the user's biometrics, environmental conditions, motion, location, and/or other information related to the user or the environment. Using the computing device or other device, the user may be listening to music while the various external parameters are being provided to the computing device. The computing device may use a user-defined profile that includes settings for automatic haptic feedback determinations for music (or other context). The computing device may use the user profile, other external parameters, and the music to automatically determine haptic feedback, which may be output to the user via one or more haptic output devices that are included with the computing device, one or more wearable devices, and/or other device. In this manner, the computing device may take into account various information associated with the playback of the music (e.g., whether the user is exercising, the user's biometric condition, etc.) to determine haptic feedback based on the music.

DETAILED DESCRIPTION OF THE INVENTION

The disclosure relates to systems and methods of providing haptic feedback based on media content and external parameters used to customize the haptic feedback.

Figure 1:
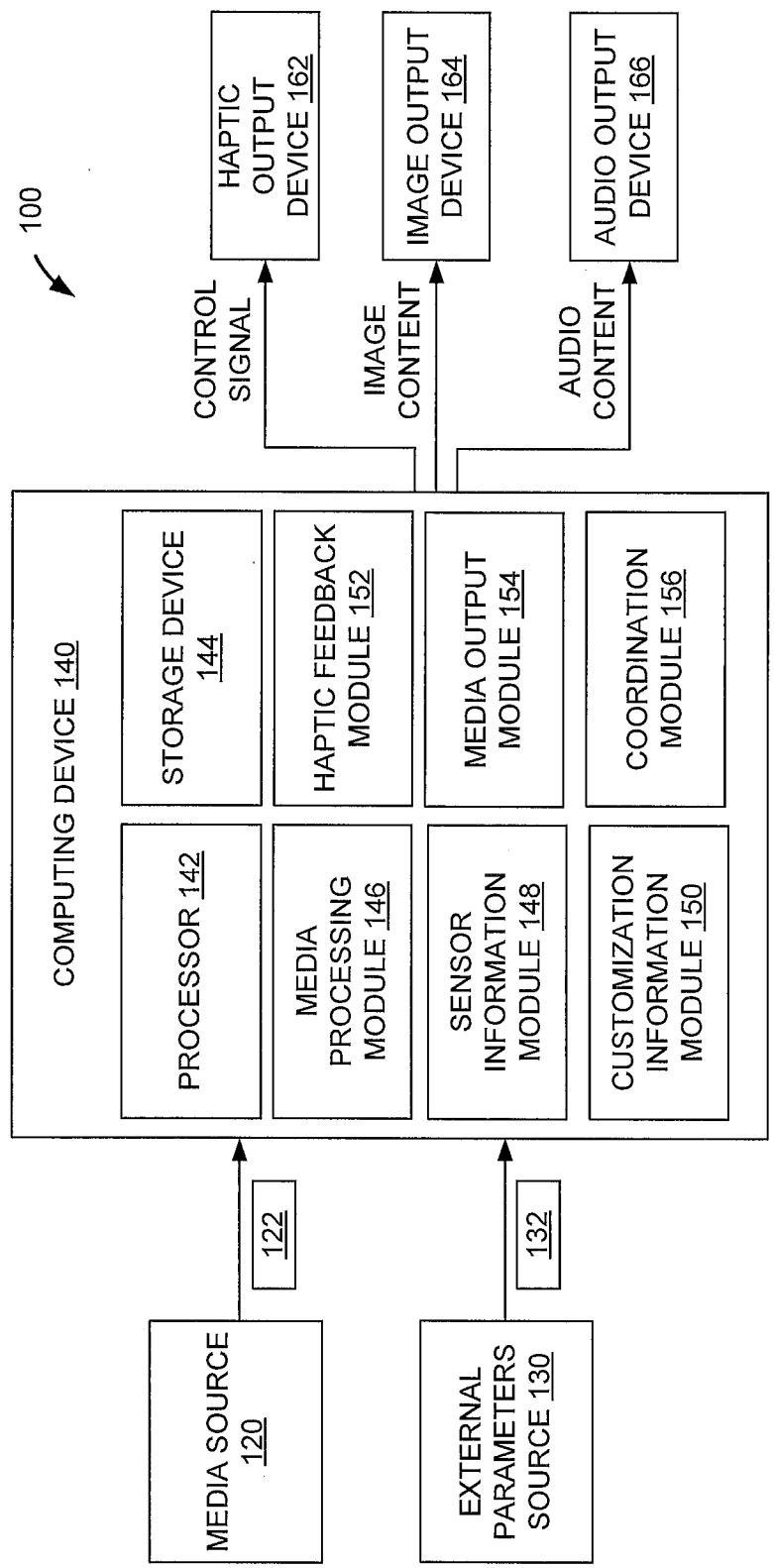
FIG. 1 schematically illustrates a system for providing haptic feedback based on media content and external parameters used to customize the haptic feedback, according to an aspect of the invention.

FIG. 1 illustrates a system 100 for providing haptic feedback based on media content and external parameters used to customize the haptic feedback, according to an aspect of the invention. System 100 may include a media source 120 that provides media content 122, an external parameters source 130 that provides one or more external parameters 132, a computing device 140, a haptic output device 162, an image output device 164, an audio output device 166, and/or other components. Although only single ones of the foregoing components are illustrated in FIG. 1, more than one of such components may be used.

Computing device 140 may be programmed, as described below, to automatically generate one or more control signals that cause one or more haptic output devices 162 to output haptic feedback. Computing device 140 may automatically generate the control signal based on various characteristics of media content 122, such as a tempo of audio content, while taking into account external parameters 132. For example, computing device 140 may automatically determine haptic feedback to be provided based on a combination of media content 122 and one or more external parameters 132. In some instances, computing device 140 may automatically determine haptic feedback to be provided based on media content 122 and then modify (e.g., alter a characteristic of) the automatically determined haptic feedback based on external parameters 132.

Media content 122 may include audio content, image content (e.g., video, still images, visual representations of video games, etc.), and/or other content. Media content 122 may be configured as video, audio, a video game representation, and/or other media that can be played or otherwise output. External parameters 132 may include sensor information, customization information, and/or other information (including combinations of any of the foregoing) that are separate from the characteristics (referred to herein interchangeably as "properties" as well) of media content 122 used to render the media encoded therein.

The sensor information may include information from one or more sensors that measure an environment (e.g., ambient temperature, atmospheric pressure, etc.), a motion or orientation (e.g., acceleration, orientation, compass, etc.), a biometric (e.g., heart-rate, body temperature, etc.), and/or other information that may be sensed or otherwise detected. The customization information may include a user profile that specifies user preferences (e.g., user preferences with respect to haptic feedback customizations for different types of media content), an indication of a type and/or number of haptic output devices being used to provide the haptic feedback, an indication of a status of a device (e.g., application running in the foreground, battery level, etc.), and/or other customization information that may be used to customize haptic feedback that is automatically determined based on media content 122.

Whether the sensor information, customization information, and/or other information is used, computing device 140 may be programmed to automatically generate a control signal that causes haptic feedback to be provided to the user based on processing media content 122 and taking into account the sensor information, the customization information, and/or other information.

For example, computing device 140 may automatically determine haptic feedback based on a tempo of music and may speed up (e.g., increase the frequency of) the determined haptic feedback when sensor information indicates a level of activity is less than a predetermined threshold. In the foregoing example, the level of activity may indicate a slowing pace of exercise by a user who is listening to the music and the haptic feedback may be sped up to encourage increasing the pace.

Alternatively or additionally, computing device 140 may automatically determine haptic feedback based on a user profile that indicates particular types of algorithms that should be used in different contexts. For example, the user profile may specify that a given algorithm be used to automatically determine haptic feedback while the user is watching a movie and that a different algorithm be used while the user is listening to music.

In this manner, computing device 140 may be programmed to process media content 122 together with one or more external parameters 132 to automatically determine haptic feedback, thereby providing a configurable and dynamic way to automatically determine haptic feedback based on the media content as well as other information that is used to customize the haptic feedback.

In some implementations, computing device 140 may include one or more processors 142 programmed with one or more computer program modules to perform the foregoing and other functions. The one or more computer program modules may be stored in one or storage devices 144. The modules may include a media processing module 146, a sensor information module 148, a customization information module 150, a haptic feedback module 152, a media output module 154, a coordination module 156, and/or other modules.

In some implementations, media processing module 146 may be configured to receive media content 122 from media source 120, storage device 144 (e.g., when media content 122 is stored locally at computing device 140), and/or other sources of media content 122. For example, media content 122 may be streamed, downloaded, copied, stored locally, created locally (e.g., via a media capture device not illustrated in FIG. 1), or otherwise obtained by media processing module 146. Whichever manner in which media content 122 is obtained, media processing module 146 may be configured to buffer media content 122 in a memory such that media content 122 is processed to automatically determine haptic feedback.

Media processing module 146 may be configured to process media content 122 by analyzing signals intended to cause video output device 164 and/or audio output device 166 to output media. The signals may include various image/video properties, audio properties, and/or other properties that result in media being output.

Such image/video properties may include, for example, a color hue, a brightness, a saturation, a number of pixels per frame, a video size, a bit rate, and/or other image/video properties that may be detected using conventional image/video processing techniques.

Audio properties may include, for example, a frequency, a sample or bit rate, a bit depth, an amplitude, and/or other audio properties that may be detected using conventional audio processing techniques. In some implementations, media processing module 146 may process multiple channels that may be included in media content 122. Such individual channels may be used individually or in combination with one another to automatically determine haptic feedback. Media processing module 146 may use various techniques for audio processing, such as disclosed in co-owned U.S. patent application Ser. No. 13/365,984, filed on Feb. 3, 2012, entitled "Sound to Haptic Effect Conversion System using Amplitude Value," published as U.S. Patent Application Publication No. 2012/0206246 on Aug. 16, 2012, and U.S. Patent application Ser. No. 13/366,010, filed on Feb. 3, 2012, entitled "Sound to Haptic Effect Conversion System using Waveform," published as U.S. Patent Application Publication No. 2012/0206247 on Aug. 16, 2012, the entireties of which are incorporated by reference herein.

In some implementations, sensor information module 148 may be configured to receive sensor information used to automatically determine haptic feedback (e.g., by generating control signals that cause the haptic feedback). The sensor information may be received via a wireless or wired network, which can include the Internet, local networks, and/or other networks as described herein. The sensor information may include environmental information that describes an environment, positioning/orientation/motion information that describes an object/device, biometric information that describes a physiological/mental condition of a user, and/or other information. As such, external parameters source 130 may include an accelerometer, a gyroscope, a magnetometer, a thermometer, a heart rate monitor, an Electrocardiography ("ECG") sensor, an electrodermal response ("EDR") sensor, a galvanic skin response ("GSR") sensor, a pyschogalvanic reflex ("PGR") sensor, a blood pressure sensor, a glucose monitor, and/or other sensors that can produce sensor information. In some implementations, external parameters source 130 may be configured as one or more wearable devices that track the user who is wearing the device to thereby sense movements, user conditions, environmental conditions, and/or other information related to the user.

In some implementations, customization information module 150 may be configured to receive customization information used to automatically determine haptic feedback. The customization may include, for example, user profile information, haptic output device information, device status information (e.g., information that indicates a current state of computing device 140 or other device), and/or other information. As such, external parameters source 130 may include a computing device at which the user may provide and/or store user profiles, a computing device at which media content is displayed (e.g., computing device 140), and/or other device that may provide the customization information.

In some implementations, haptic feedback module 152 may be configured to generate a control signal based on media content 122 that causes one or more haptic output devices 162 to provide haptic feedback. In some implementations, meta-data from media content 122 if available may be used to further guide haptic feedback determinations. For example, certain information such as the tempo of music may be obtained in order to guide overall haptic feedback that is determined by haptic feedback module 152.

Haptic feedback module 152 may use media content 122 (e.g., information obtained by media processing module 146 based on processing media content 122) to determine haptic feedback and monitor external parameters received by sensor information module 148 and/or customization information module 150. For example, haptic feedback module 152 may apply a low pass filter to identify particular portions (e.g., beats) of music for which haptic feedback should be provided. The portions of music may be used to determine haptic feedback (together with one or more external parameters 132 and/or modified based on the external parameters).

In some implementations, haptic feedback module 152 may determine haptic feedback by simultaneously taking into account media content 122 and one or more external parameters 132. One example of processing may include assigning each of the media content 122 and external parameter(s) 132 (which may include one or more different kinds of external parameters described herein) with a weight factor used to determine a relative importance when determining haptic feedback.

For example, a tempo of media content 122 may be assigned with a first weight and a biometric reading from external parameters 132 may be assigned with a second weight. Haptic feedback module 152 may determine a first frequency of haptic feedback based on the tempo and a second frequency of the haptic feedback based on the biometric reading. Haptic feedback module 152 may determine a final frequency based on the first frequency, the first weight, the second frequency, and the second weight. For example, haptic feedback module 152 may average the weighted first frequency (e.g., first frequency multiplied or otherwise weighted by the first weight) and the weighted second frequency (e.g., second frequency similarly weighted by the second weight).

Other methods of taking account of relative importance of data values may be used as well. Furthermore, other numbers of external parameters may be used and each may be assigned with their own respective weights. Still further, one or more other properties or characteristics other than frequency of haptic feedback may similarly processed and characteristics of signals from media content 122 other than a tempo may be used and each may be assigned with their own respective weights.

In some implementations, haptic feedback module 152 may determine haptic feedback by first determining haptic feedback based on media content 122 without external parameters 132. In these implementations, haptic feedback module 152 may modify the determined haptic feedback based on one or more external parameters 132. Continuing the foregoing non-limiting example, haptic feedback module 152 may use a tempo of media content 122 to determine haptic feedback. The one or more external parameters 132 may then be used to modify the haptic feedback.

In some implementations, haptic feedback module 152 may determine haptic feedback simultaneously using media content 122 and a first set of one or more external parameters 132 (weighting each as described above). Haptic feedback module 152 may then modify the determined haptic feedback based on a second set of one or more external parameters 132. For example, haptic feedback module 152 may determine haptic feedback by weighting a tempo of media content 122 and biometric information. Haptic feedback module 152 may then modify the determined haptic feedback based on environmental information such as an ambient temperature.

Regardless of which information and when such information is used, haptic feedback module 152 may apply the foregoing information to arrive at a modification factor to determine the haptic feedback.

Haptic feedback module 152 may handle the modification factor in various ways. For example, the modification factor may include a scale factor, a threshold factor, and/or other information used to modify or otherwise determine the haptic feedback. The scale factor may be used to adjust upward or downward a characteristic of haptic feedback. The threshold factor may be used to filter out information (e.g., information that describes media content 122 or external parameters 132) unless such information exceeds a threshold factor.

In some implementations, haptic feedback module 152 may be configured to determine a first characteristic of haptic feedback based on a first type of information and determine a second characteristic of haptic feedback based on a second type of information. For example, haptic feedback module 152 may determine a magnitude of haptic feedback based on low-pass filter data that indicates bass in music or an explosion in video. Haptic feedback module 152 may determine a frequency of the haptic feedback based on biometric information such as a heart pace of a user who is being monitored and is using system 100. Haptic feedback module 152 may determine the first and/or second characteristic of the haptic feedback based on other external parameters 152 as described herein (e.g., low-pass frequency data combined with and/or later modified by external parameters).

In some implementations, haptic feedback module 152 may have access to instructions (e.g., have hard-coded instructions and/or receive or obtain instructions) such as algorithms that are programmed for use with particular types of media. For example, haptic feedback module 152 may use a first algorithm for processing music into haptic feedback and a second algorithm for processing video into haptic feedback. Other algorithms for other types of media content 122 may be used as well. The user may configure system 100 via a user profile that is stored at, for example, storage device 144 or other tangible storage location, to use different algorithms for different types of media. In these implementations, haptic feedback module 152 may use the appropriate algorithm based on the user profile and based on the type of media content being played.

In some implementations, haptic feedback module 152 may use rules configured by the developer and/or user of computing device 140 to specify the haptic feedback. For example, the rules may include one or more thresholds that trigger modifications of haptic feedback to be provided. The thresholds may relate to any one or more of the external parameters 132. In a particular example, the external parameters may include altitude information such that the user may set a threshold altitude above which haptic feedback is determined based on a particular algorithm (e.g., one designed to increase the frequency of haptic feedback at higher altitudes) and/or above which haptic feedback is modified by a particular modification factor. Other thresholds for other external parameters 132 may be used as well, either alone or in combination with still other thresholds.

In some implementations, media output module 154 may be configured to output media content 122. Media output module 154 may provide media content 122 using conventional media formats to, for example, image output device 164, audio output device 166, and/or other media output device.

In some implementations, coordination module 156 may be configured to coordinate media output and control signal output respectively to media output devices (e.g., image output device 164 and audio output device 166) and haptic output device 162. In some implementations, coordination module 156 may synchronize the image output, control signal (e.g., haptic feedback caused by the control signal), and audio output according to a synchronizing code embedded into media content 122 and/or via time stamps that generally set a time for outputting each of the video output, audio output, and haptic feedback.

As would be appreciated, media content 122 may include both audio content and video content. Computing device 140 may process audio, video, and/or other media of media content 122 as described herein to provide haptic feedback that varies spatially.

Having described an overview of examples of various system components, attention will now be turned to the different types of external parameters 132 that are used and processed by computing device 140 to automatically determine haptic feedback based on media content 122.

Figure 2:
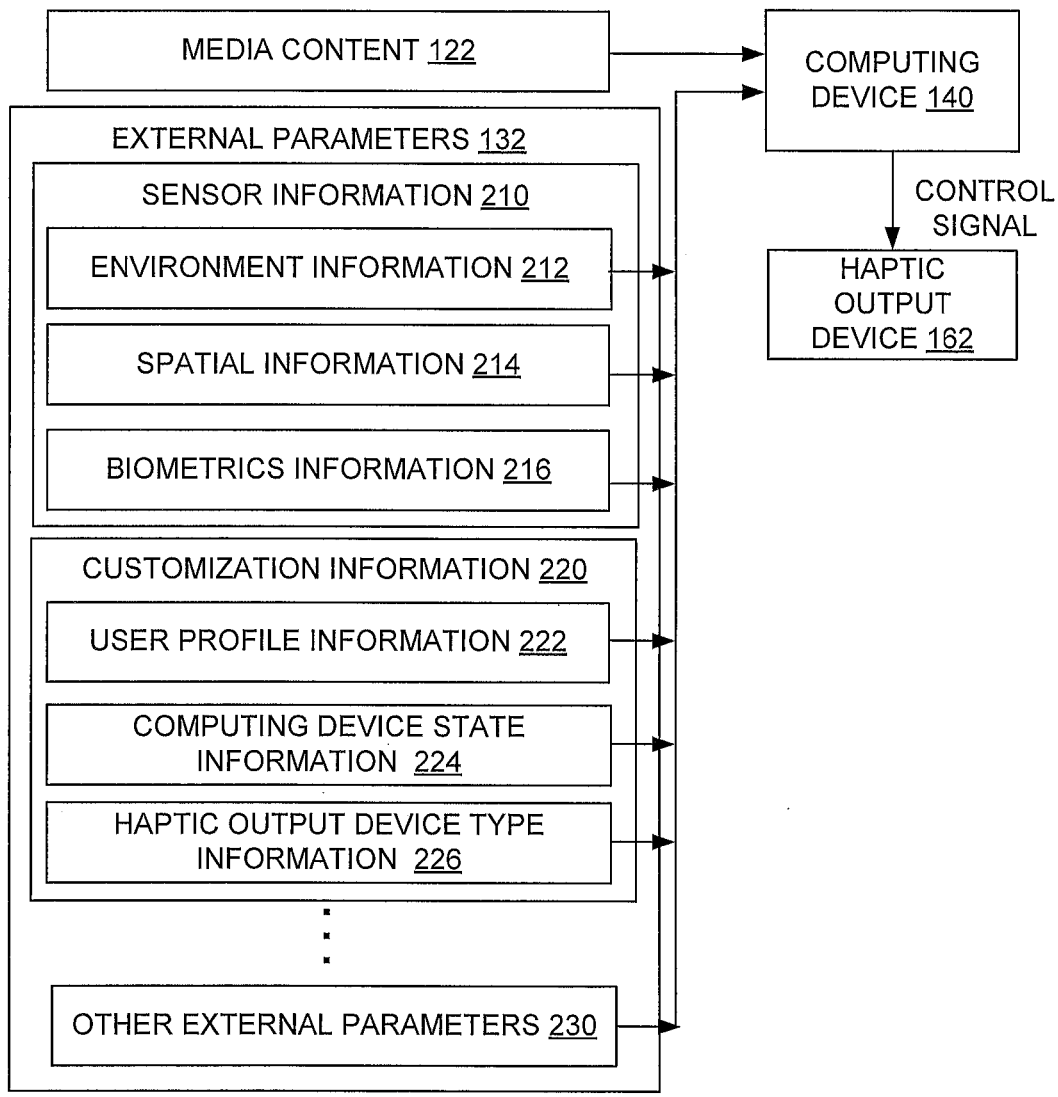
FIG. 2 schematically illustrates different types of external parameters used by a computing device to automatically determine haptic feedback based on media content, according to an aspect of the invention.

FIG. 2 illustrates different types of external parameters 132 that may be used by computing device 140 to automatically determine haptic feedback based on media content 122, according to an aspect of the invention. Computing device 140 may be programmed by one or more of the modules illustrated in FIG. 1 to automatically determine haptic feedback based on media content and one or more external parameters 132. In some implementations, external parameters 132 may include sensor information 210, customization information 220, other external parameters 230, and/or other information.

Sensor information 210 may include information from one or more sensors that sense conditions of a user, object, environment, etc. For example, sensor information 210 may include environment information 212, spatial information 214, biometrics information 216, and/or other information.

Environment information 212 may include ambient temperature, atmospheric pressure, altitude, and/or other information that can describe an environmental condition. In these implementations, the external parameters source 130 illustrated in FIG. 1 may include a temperature sensor, a barometric pressure sensor, an altimeter, and/or other device that can sense environmental information 212.

Computing device 140 may be programmed to take into account environment information 212 when determining haptic feedback to be provided based on media content 122. Computing device 140 may determine haptic feedback based on media content 122 differently based on different environment information 212. In a non-limiting example, computing device 140 may be programmed to determine a first haptic feedback for a given song when the ambient temperature is a first temperature and determine a second (different) haptic feedback for the same song when the ambient temperature is a second (different) temperature. In the foregoing example, a user who is exercising to the music when the ambient temperature is at a first temperature may be provided with haptic feedback that is different than when the ambient temperature is at a second temperature, even though the same music is used as a basis for determining the haptic feedback as described herein. In this manner, computing device 140 may determine haptic feedback that varies depending on environmental information 212.

Computing device 140 may use spatial information 214 when determining haptic feedback based on media content 122. Spatial information 214 may include motion, orientation, location, and/or other information that can describe an object within a space. In these implementations, the external parameters source 130 illustrated in FIG. 1 may include an accelerometer, a gyroscope, a magnetometer, a Global Positioning System (GPS) sensor or other device that may be used to provide location information, and/or other device that can sense spatial information 214.

Computing device 140 may determine haptic feedback based on media content differently based on different spatial information 214. Computing device 140 may use spatial information 214 according to one or more modes of operation.

In a first mode of operation, computing device 140 may use at least some of the spatial information 214 to compensate for vibratory "noise" by increasing the frequency, magnitude and/or other characteristic of haptic feedback. For example, a user may be viewing a given movie using computing device 140 while sitting on a couch where little vibratory noise is occurring. Computing device 140 may be programmed to determine a first haptic feedback based on the movie and the spatial information 214 (e.g., based on little vibratory noise being detected based on accelerometer, gyroscope, and/or other sensor-based spatial information). The user may view the same movie on a train such that vibratory noise is detected. Computing device 140 may compensate for the vibratory noise by causing a second haptic feedback having a higher magnitude (for example) than the first haptic feedback even though each of the haptic feedback in both instances is based on the same movie. In this manner, computing device 140 may determine haptic feedback that varies depending on spatial information 214.

In another mode of operation, computing device 140 may use at least some of the spatial information 214 to determine a level of activity. For example, based on motion or other sensor information, computing device 140 may determine a level of user activity, which may be used to adjust the determined haptic feedback. In this manner, computing device 140 may adjust the haptic feedback to be provided based on media content 122 according to the level of user activity (e.g., increase a frequency, magnitude, and/or other characteristic of the haptic feedback to encourage performance).

In another mode of operation, computing device 140 may use at least some of the spatial information 214 to determine a location of the user. In this manner, different geographical locations of the user may be used to determine different haptic feedback that is based on media content 122. In a non-limiting example, a user listening to music while exercising at a first location may be provided with a first haptic feedback when at a first location and provided with a second (different) haptic feedback when at a second (different) location even though the user may be listening to the same music (which is also used to determine the haptic feedback). In this manner, depending on where the user is located, computing device 140 may be programmed to determine haptic feedback based on media content 122 that varies based on the user location. In other examples, haptic feedback based on media content 122 may be varied depending on a distance to a location. In some implementations, the spatial information 214 may include proximity information such that a proximity to an object may influence the haptic feedback determination. In these implementations, the haptic feedback based on media content 122 may be varied as an alert that an object is approaching or is otherwise in close proximity.

Computing device 140 may use biometrics information 216 when determining haptic feedback based on media content 122. Biometrics information 216 may include heart rate, skin conductance (e.g., to detect skin moisture levels/perspiration), blood pressure, body temperature, glucose level, and/or other information that can describe a biological state or condition of a user. In these implementations, the external parameters source illustrated in FIG. 1 may include an Electrocardiography (ECG) sensor, a galvanic skin response ("GSR") sensor, a pyschogalvanic reflex ("PGR") sensor, a blood pressure sensor, a body temperature sensor, a glucose monitor, and/or other sensors that can sense biometrics information 216.

Computing device 140 may determine haptic feedback based on media content 122 differently based on different biometrics information 216. In a non-limiting example, computing device 140 may be programmed to determine a user's fatigue or other biological condition using the biometrics information 216 and determine haptic feedback based on media content 122 according to the biological condition. By analyzing the user's biological condition, computing device 140 may detect that the user's level of fatigue is high and performance level is degrading as a result. To counter the effect of fatigue, while keeping the periodicity of the haptic feedback in synch with the overall rhythm of music or other media content 122, computing device 140 may enhance the tempo of haptic feedback that would ordinarily be provided in response to the music in order to motivate the user to continue with the exercise. In the foregoing example, although the haptic feedback may continue to be synchronized with the music, the quantity of haptic feedback delivered at a given moment may be increased to encourage the user to continue with the exercise. In this manner, computing device 140 may determine haptic feedback based on media content 122 that varies according the user's biological condition.

Customization information 220 may include user profile information 222, computing device state information 224, haptic output device type information 226, and/or other customization information.

User profile information 222 may include user configurable settings that allow the user to determine algorithms or techniques by which haptic feedback is automatically generated. The user configurable settings may be stored as user profile information 222 for use by computing device 140 when automatically determining haptic feedback. In this manner, computing device 140 may expose low-level sound-to-haptics algorithms in a way that is understandable to a user and may store user preferences that are used to automatically determine haptic feedback.

In some implementations, for example, user profile information 222 may specify that different algorithms be used for different types of applications/activities. In a particular example, the user may specify that computing device 140 use a particular sound-to-haptic algorithm for movies, another sound-to-haptic algorithm for music, still another sound-to-haptic algorithm for video games, and so on.

In some of these implementations, computing device 140 may use computing device state information 224 to determine an application is executing in the foreground of a device used to provide the haptic feedback. For example, if computing device 140 outputs the haptic feedback (as well as determine the haptic feedback to be provided), computing device state information 224 may refer to the state of computing device 140.

Computing device state information 224 may be received from the user operating computing device 140 and/or other device that outputs the haptic feedback or may be automatically determined. When received from the user, the user may control which algorithm or processing is used to automatically determine haptic feedback. For instance, a user may input (and computing device 140 may receive) an indication that the user is listening to music and that a music profile should be used to automatically determine haptic feedback.

In some implementations where the computing device state information 224 is automatically determined, computing device 140 may automatically determine an application that is executing in the foreground. Such information may be used to infer the type of media, for example, that is being played. In particular, a multi-media player application may suggest that a video/movie is being played, while a music player application may suggest that music is being played, while a gaming application may suggest that a video game is being played. Other types of applications running in the foreground may be used to similarly determine the current state of computing device 140 or other device that provides the haptic feedback. For example, if an exercise application is running in the foreground, computing device 140 may determine that the device state corresponds to a user who is exercising. Computing device 140 and/or other device at which haptic feedback is output may be carried, worn by, or otherwise associated with the user who is exercising and computing device 140 may select one or more exercise profiles to be used for automatically determining haptic feedback.

Computing device 140 may accordingly be used to automatically determine haptic feedback based on the computing device state information 224 in various contexts and states and/or the user profile information 222.

In some implementations, computing device 140 may take into account the type and/or number of haptic output devices used to output the haptic feedback when automatically determining haptic feedback. For example, computing device 140 may use haptic output device type information 226, which indicates the number and/or type of haptic output devices used to provide the haptic feedback, when automatically determining haptic feedback.

In some implementations, the haptic output device type information 226 may be configurable by the user, automatically determined, and/or based on a database of haptic output device information that specifies characteristics (e.g., type and/or number) of haptic output devices for a given system that outputs haptic feedback. In implementations where computing device 140 also outputs haptic feedback, computing device 140 may pre-store haptic output device type information 226. Based on the haptic output device configuration and the algorithm/profile that the user selected, computing device 140 may use the appropriate algorithm. For example, if a Linear Resonant Actuator ("LRA") is used to output the haptic feedback, computing device 140 may automatically determine haptic feedback that is specifically tailored to be generated by LRA types of haptic output devices. Other types and/or numbers of haptic output devices may be similarly associated with respective algorithms used to generate haptic feedback. Furthermore, the foregoing information may be combined to identify particular algorithms to be used to automatically generate haptic feedback. For example, a user-defined 'Bassy' profile for music may be coupled with information that indicates a given type and/or number of haptic output devices to automatically determine the haptic feedback.

In some implementations, computing device 140 and/or other device that outputs the haptic feedback may automatically determine haptic feedback without intervention or preferences by the user. In these implementations, computing device 140 may include one or more profiles that are associated with processing techniques that are used to automatically generate haptic feedback.

In some implementations, other external parameters 230 may be manually input by the user so that the control signal to the haptic output device 162 may be manually customized based on at least one characteristic of the media content 122. In some implementations, computing device 140 may be programmed to customize the control signal to the haptic output device 162 based on at least one characteristic of the media content 122.

Referring back to FIG. 1, in some implementations, haptic output device 162 may include an actuator, for example, an electromagnetic actuator such as an Eccentric Rotating Mass ("ERM") in which an eccentric mass is moved by a motor, a LRA in which a mass attached to a spring is driven back and forth, or a "smart material" such as piezoelectric, electro-active polymers, or shape memory alloys, a macro-composite fiber actuator, an electro-static actuator, an electro-tactile actuator, and/or another type of actuator that provides a physical feedback such as a haptic (e.g., vibrotactile) feedback. The haptic output device 162 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

In some implementations, image output device 164 may include a display such as a touchscreen display, a monitor, and/or other display that can display the image content such as videos, still images, game representations, etc. In some implementations, audio output device 166 may include speakers, headphones, or other devices that can emit audio. In some implementations, image output device 164, haptic output device 162, and/or audio output device 166 may be integrated with computing device 140. In some implementations, image output device 164, haptic output device 162, and/or audio output device 166 may be housed separately from computing device 140.

Storage device 144 may include one or both of system storage that is provided integrally (i.e., substantially nonremovable) with computing device 140 and/or removable storage that is removably connectable to computing device 140 via, for example, a port (e.g., a USB port, a firewire port, etc.) or a drive (e.g., a disk drive, etc.). Storage device 144 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable non-transitory storage media. Storage device 144 may include one or more virtual storage resources (e.g., cloud storage, a virtual private network, and/or other virtual storage resources). Storage device 144 may store software algorithms, information determined by processor(s) 142, information received from computing device 140, and/or other information that enables computing device 140 to function as described herein.

Processor(s) 142 are configured to provide information processing capabilities in computing device 140. As such, processor(s) 142 may include one or more of a digital processor, an analog processor, a digital circuit designed to process information, an analog circuit designed to process information, a state machine, and/or other mechanisms for electronically processing information. Although processor(s) 142 is illustrated in FIG. 1 as a single entity, this is for illustrative purposes only. In some implementations, processor(s) 142 may include a plurality of processing units. These processing units may be physically located within the same device, or processor(s) 142 may represent processing functionality of a plurality of devices operating in coordination. Processor(s) 142 may be configured to execute modules by software; hardware; firmware; some combination of software, hardware, and/or firmware; and/or other mechanisms for configuring processing capabilities on processor(s) 142.

The various modules described herein are exemplary only. Other configurations and numbers of modules may be used, as well using non-modular approaches so long as the one or more physical processors are programmed to perform the functions described herein. It should be appreciated that although the various modules are illustrated in FIG. 1 as being co-located within a single processing unit, in implementations in which processor(s) 142 includes multiple processing units, one or more modules may be located remotely from the other modules. The description of the functionality provided by the different modules described herein is for illustrative purposes, and is not intended to be limiting, as any of modules may provide more or less functionality than is described. For example, one or more of the modules may be eliminated, and some or all of its functionality may be provided by other ones of the modules. As another example, processor(s) 142 may be configured to execute one or more additional modules that may perform some or all of the functionality attributed herein to one of modules.

The components illustrated in FIG. 1 may be communicably coupled to one another via various communication links such as a network. The network may include wired or wireless connections. In some aspects of the invention, the network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Various inputs, outputs, configurations, and/or other information described herein as being stored or storable may be stored in one or more databases (not illustrated in FIG. 1). Such databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 3:
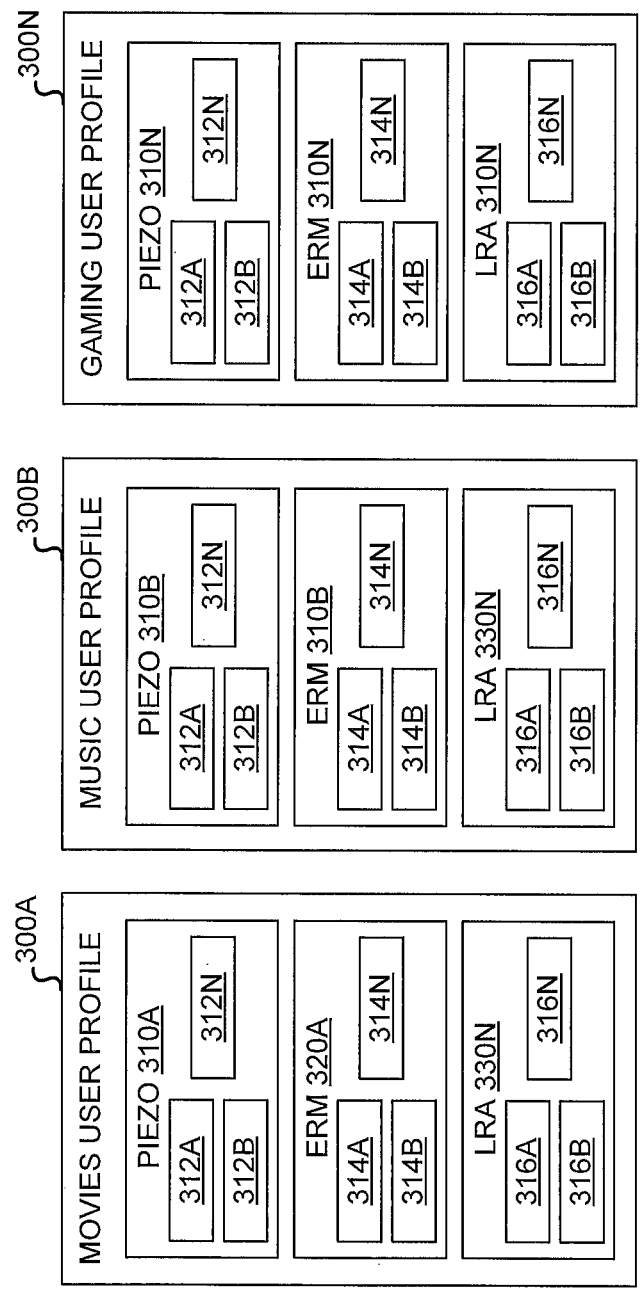
FIG. 3 schematically illustrates a schematic illustration of different profiles used by the computing device to automatically determine haptic feedback based on media content, according to an aspect of the invention.

FIG. 3 illustrates a schematic illustration of different profiles 300 (illustrated in FIG. 3 as profiles 300A, 300B, 300N) used by the computing device 140 to automatically determine haptic feedback based on media content 122, according to an aspect of the invention. Each profile 300 may be configurable, such as by a developer (e.g., one who develops the modules used by computing device 140 illustrated in FIG. 1) and/or the user who is to receive the haptic feedback. The profiles 300 may include information that specifies: parameters used to automatically determine haptic feedback (e.g., particular levels of bass in music should be associated with particular amplitudes of haptic feedback while particular levels of bass in movies should be associated with different amplitudes of haptic feedback), particular algorithms or processing to use when automatically determining haptic feedback, and/or other settings that may affect automatic determination of haptic feedback.

In some implementations, profiles 300 may relate to different contexts. For example, as illustrated, movies user profile 300A may include information used to automatically determine haptic feedback for movie content (e.g., when movies are being played), music user profile 300B may include information used to automatically determine haptic feedback for music content (e.g., when music is being played), and gaming user profile 300N may include information used to automatically determine haptic feedback for gaming content (e.g., when video games are being played).

In some implementations, each profile 300 may include settings for different types of haptic output devices. In other words, profile 300 may be used to tailor automatic determinations of haptic feedback based on a type of haptic output device that is used to output the haptic feedback. For example, each profile 300 may include settings 312 for a piezoelectric 310A type of haptic output device, settings 314 for an ERM 320 type of haptic output device, settings 316 for a LRA 330 type of haptic output device, and/or other settings for other types of haptic output devices. Each setting may relate to parameters, algorithms, etc., used to automatically determine haptic feedback as described herein.

Other profiles (not illustrated) may include information used to automatically determine haptic feedback in other contexts, such as when the user is exercising, driving, and/or performing other activity that can be deduced from the external parameters described herein. As such, the profiles 300 are not limited to those illustrated in FIG. 3. Computing device 140 (illustrated in FIG. 1) may use each profile 300 to customize how to automatically determine haptic feedback based on a context in which media content is played such as the type of media content being played, a user activity during which the media content is played, a type of haptic output device used to output the haptic feedback, and/or other contexts.

In some implementations, profiles 300 may be stored in a storage device that is accessible to or otherwise included in computing device 140, which automatically determines the haptic feedback to be provided. In some implementations, profiles 300 may be hard-coded or otherwise be included as a module that programs computing device 140. In some of these implementations, the profiles 300 may or may not be configurable by the user who receives the haptic feedback.

Figure 4:
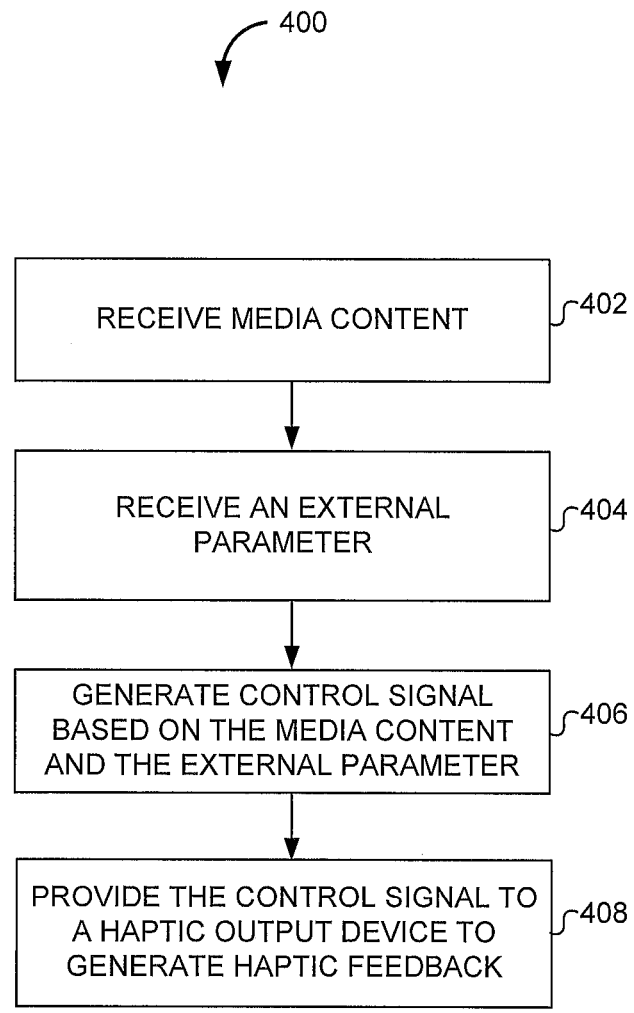
FIG. 4 schematically illustrates an example of a process for automatically determining haptic feedback based on media content and external parameters, according to an aspect of the invention.

FIG. 4 illustrates an example of a process 400 for automatically determining haptic feedback based on media content and external parameters, according to an aspect of the invention. The various processing operations depicted in the flowchart of FIG. 4 and other Figures are described in greater detail herein. The described operations may be accomplished using some or all of the system components described in detail above. According to an aspect of the invention, various operations may be performed in different sequences. In other implementations, additional operations may be performed along with some or all of the operations shown in FIG. 4 and other Figures, or some operations may be omitted. In yet other implementations, one or more operations may be performed simultaneously. Accordingly, the operations as illustrated (and described in greater detail below) are exemplary in nature and, as such, should not be viewed as limiting.

In an operation 402, media content may be received. The media content may be received via a stream (e.g., content that is delivered over a network such as the Internet), a download, via a local storage (that stored a stream or a download) to which process 400 has access, and/or other manner in which the media content may be received or otherwise obtained. Regardless of how the media content is received, the media content may be processed to determine one or more characteristics of the media content. Such characteristics may be used as a factor to determine haptic feedback that should be provided.

In an operation 404, an external parameter may be received in a manner similar to the media content. Additionally or alternatively, the external parameter may be received from a connected device such as a sensor, which may include a biometric sensor, a position/orientation/location sensor, and/or other type of sensor. Regardless of how the external parameter is received, the external parameters may be used to alter or otherwise automatically determine haptic feedback that should be provided.

In an operation 406, a control signal may be generated based on the media content and the external parameters. The control signal may be configured to cause one or more haptic output devices to output haptic feedback. In this manner, process 400 may be used to automatically determine haptic feedback that should be provided and may encode such haptic feedback into a control signal, which can include a drive signal that is applied to the haptic output device and/or instructions that are used to cause the haptic output device to output the haptic feedback.

In some implementations, the media characteristics may be used to automatically determine a haptic feedback to be provided and then the external parameters may be used to scale or otherwise modify the haptic feedback to be provided. In some implementations, the haptic feedback and the external parameters may be together used to automatically determine the haptic feedback. In some implementations, the media characteristics and/or the external parameters may each be weighted to indicate a level in which the media characteristics and/or the external parameters affect the haptic feedback to be provided. Such weights may be stored as part of a profile or otherwise associated with the external parameter.

In an operation 408, the control signal may be provided to the one or more haptic output devices. In some implementations, the control signal may be provided to a remote device via wired or wireless connections. In other implementations, the control signal may be provided via an internal connection such as an internal bus.

Figure 5:
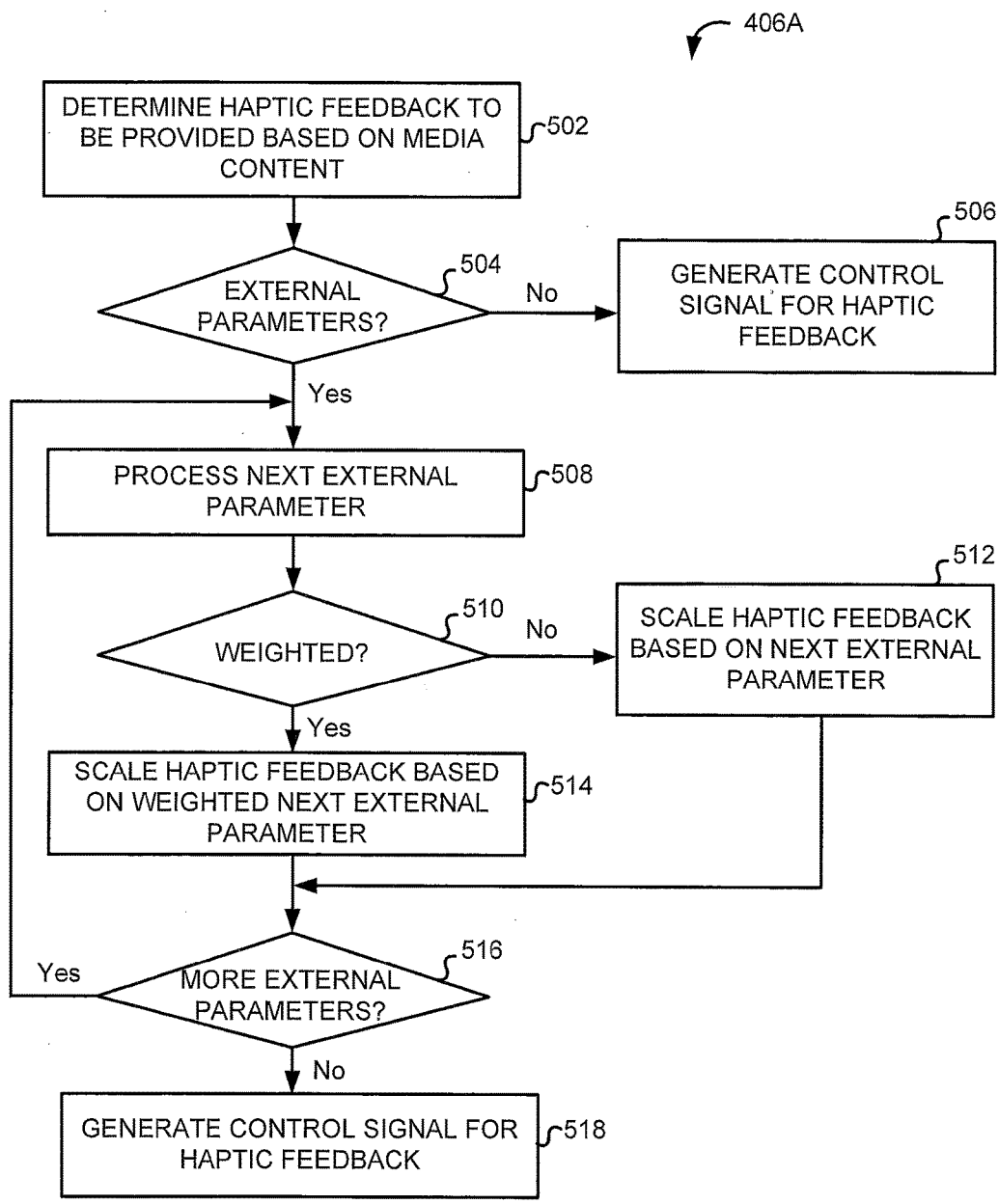
FIG. 5 schematically illustrates an example of a process for scaling automatically determined haptic feedback based on external parameters, according to an aspect of the invention.

FIG. 5 illustrates an example of a process 406A for scaling automatically determined haptic feedback based on external parameters, according to an aspect of the invention. In an operation 502, haptic feedback to be provided may be automatically determined based on media content. Such haptic feedback may be automatically determined using the systems and methods as described in co-owned U.S. patent application Ser. No. 13/365,984, published as U.S. Patent Application Publication No. 2012/0206246 on Aug. 16, 2012, and U.S. patent application Ser. No. 13/366,010, published as U.S. Patent Application Publication No. 2012/0206247 on Aug. 16, 2012, which were incorporated by reference herein.

In an operation 504, a determination of whether external parameters are available may be made. If external parameters are not available (e.g., have not been input or found), a control signal that causes the haptic feedback may be generated in an operation 506. On the other hand, if external parameters are available, the next external parameter may be processed in an operation 508.

In an operation 510, a determination of whether the next external parameter is weighted may be made. If the next external parameter is not weighted, the haptic feedback may be scaled based on the next external parameter in an operation 512. For example, the next external parameter may specify a setting that increases or decreases a characteristic of the haptic feedback and/or may include an algorithm or processing instructions for altering the haptic feedback.

If the next external parameter is weighted, the weighted external parameter may be used to scale the haptic feedback in an operation 514. For example, a weighted external parameter may indicate a proportion of scaling at which the haptic feedback should be scaled. In this manner, the relative importance of each external parameter compared to other external parameters may be taken into account when scaling the haptic feedback.

In an operation 516, a determination of whether more external parameters are available may be made. If more external parameters are available, process 406A may return to operation 508, where the next external parameter is processed. If no more external parameters are available, a control signal may be generated for the scaled haptic feedback in an operation 518. The control signal may be generated based on conventional signal processing techniques that can specify a characteristic of the haptic feedback to be provided. Such characteristics may have been automatically determined based on media content and external parameters as described herein.

Figure 6:
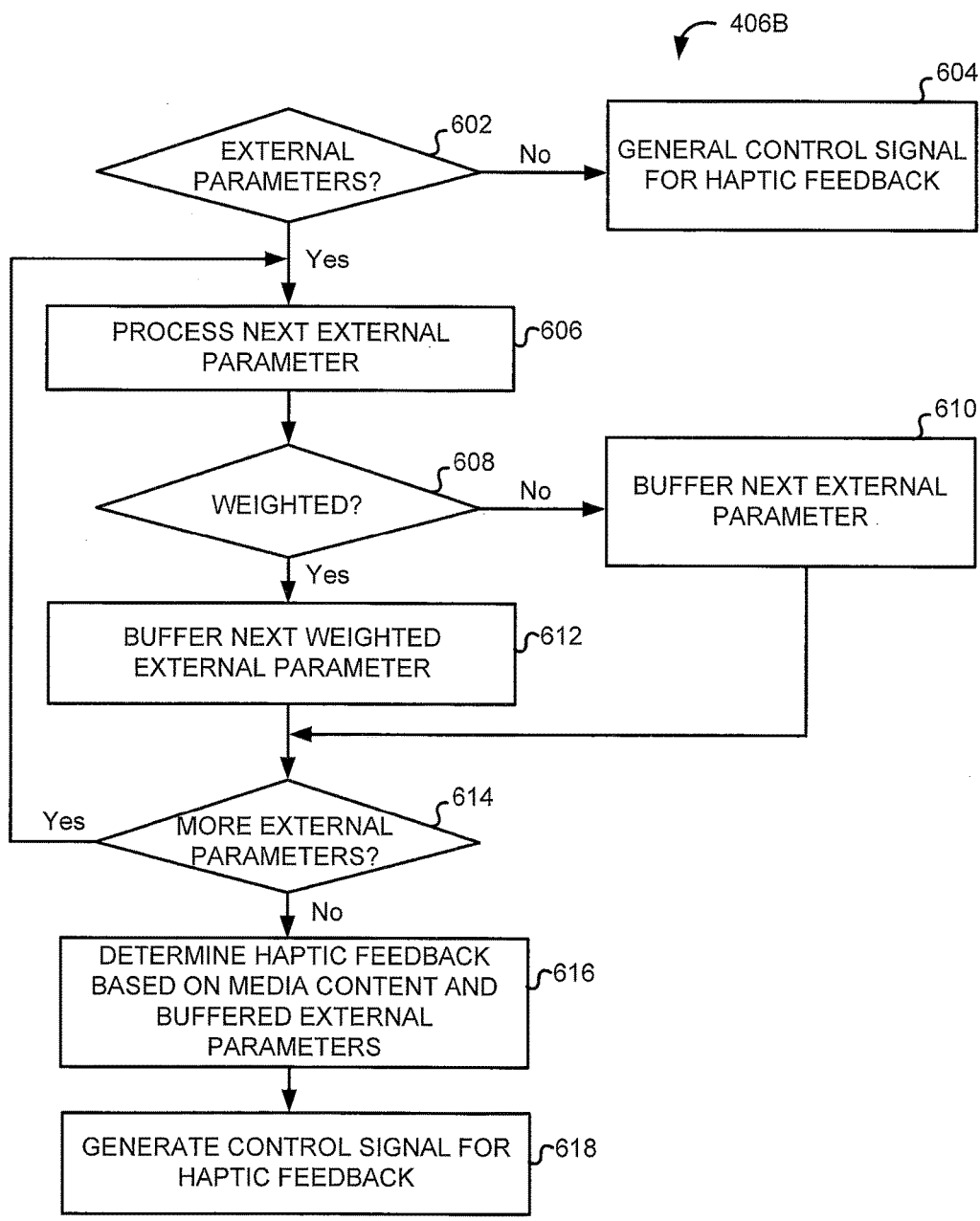
FIG. 6 schematically illustrates an example of a process for automatically determining haptic feedback based on media content and external parameters, according to an aspect of the invention.

FIG. 6 illustrates an example of a process 406B for automatically determining haptic feedback based on media content and external parameters, according to an aspect of the invention. In an operation 602, a determination of whether external parameters are available may be made. If no external parameters are available, then a control signal for the haptic feedback may be generated in an operation 604. On the other hand, if external parameters are available, the next external parameter may be processed in an operation 606.

In an operation 608, a determination of whether the next external parameter should be weighted may be made. Depending on whether the next external parameter is to be weighted, either the non-weighted or weighted next external parameter may be buffered in a memory in an operation 610 or 612. In an operation 614, a determination of whether there are more external parameters to process may be made. If more external parameters are available, then process 406B may return to operation 606, where the next external parameter may be processed.

If no more external parameters are available, a haptic feedback may be determined based on the media content and the buffered external parameters in an operation 616. For example, the systems and methods described herein for automatically determining haptic feedback based on media content may be modified to take into account the buffered external parameters. In particular, when determining a characteristic of a haptic feedback to be provided, such systems and methods may be modified to alter (e.g., scale up or down) the characteristic of the haptic feedback. In an operation 618, the control signal for the determined haptic feedback may be generated.

Other aspects, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method of providing haptic feedback on a system, the method comprising:
   receiving media content from a first storage device;
   receiving external parameters from a second storage device, wherein the external parameters include customization information that comprises haptic output device information;
   generating a haptic feedback signal based on the media content;
   modifying the haptic feedback signal based on the external parameters to generate a modified haptic feedback signal; and
   applying the modified haptic feedback signal to a haptic output device to generate the haptic feedback.

2. The method of claim 1, wherein the first storage device is remote from the system.

3. The method of claim 2, wherein the first storage device comprises a first cloud computing device.

4. The method of claim 1, wherein the second storage device is remote from the system and comprises a second cloud computing device.

5. The method of claim 1, wherein the external parameters further comprise sensor information.

6. The method of claim 5, wherein the sensor information comprises at least one of a measurement of an environment, a motion or orientation, or a biometric.

7. The method of claim 1, wherein the customization information further comprises a status of the system.

8. The method of claim 1, wherein the haptic output device information comprises types of actuators available to be used as the haptic output device.

9. A non-transitory computer readable medium having instructions stored thereon that, when executed by a processor, cause the processor to provide haptic feedback on a system, the providing haptic feedback comprising:
   receiving media content from a first storage device;
   receiving external parameters from a second storage device, wherein the external parameters include customization information that comprises haptic output device information;
   generating a haptic feedback signal based on the media content;
   modifying the haptic feedback signal based on the external parameters to generate a modified haptic feedback signal; and
   applying the modified haptic feedback signal to a haptic output device to generate the haptic feedback.

10. The computer readable medium of claim 9, wherein the first storage device is remote from the system.

11. The computer readable medium of claim 10, wherein the first storage device comprises a first cloud computing device.

12. The computer readable medium of claim 9, wherein the second storage device is remote from the system and comprises a second cloud computing device.

13. The computer readable medium of claim 9, wherein the external parameters further comprise sensor information.

14. The computer readable medium of claim 13, wherein the sensor information comprises at least one of a measurement of an environment, a motion or orientation, or a biometric.

15. The computer readable medium of claim 9, wherein the customization information further comprises a status of the system.

16. The computer readable medium of claim 9, wherein the haptic output device information comprises types of actuators available to be used as the haptic output device.

17. A haptically enabled system comprising:
   a processor;
   a haptic output device coupled to the processor; and
   a storage device coupled to the processor and storing instructions;
   wherein the processor, when executing the instructions, receives media content from a media source and receives external parameters from an external parameters source, wherein the external parameters include customization information that comprises haptic output device information;
   wherein the processor generates a haptic feedback signal based on the media content, modifies the haptic feedback signal based on the external parameters to generate a modified haptic feedback signal and applies the modified haptic feedback signal to the haptic output device to generate the haptic feedback.

18. The system of claim 17, wherein the media source is remote from the system.

19. The system of claim 18, wherein the media source comprises a first cloud computing device.

20. The system of claim 18, wherein the external parameters source is remote from the system and comprises a second cloud computing device.

* * * * *